(12) United States Patent
Tuunanen et al.

(10) Patent No.: US 7,353,278 B2
(45) Date of Patent: Apr. 1, 2008

(54) SYSTEM AND METHOD FOR EVENT NOTIFICATIONS IN A MULTIMEDIA NETWORK

(75) Inventors: Heikki Tuunanen, Espoo (FI); Mikael Heerman, Espoo (FI)

(73) Assignee: Nokia Corporation, Espoo (FI)

( * ) Notice: Subject to any disclaimer, the term of this patent is extended or adjusted under 35 U.S.C. 154(b) by 444 days.

(21) Appl. No.: 10/517,532

(22) PCT Filed: Jun. 4, 2003

(86) PCT No.: PCT/IB03/02603

§ 371 (c)(1),
(2), (4) Date: Dec. 13, 2004

(87) PCT Pub. No.: WO03/107692

PCT Pub. Date: Dec. 24, 2003

(65) Prior Publication Data

US 2006/0052087 A1 Mar. 9, 2006

(30) Foreign Application Priority Data

Jun. 14, 2002 (GB) ................................. 0213728.9

(51) Int. Cl.
*G06F 15/16* (2006.01)
*H04Q 7/00* (2006.01)
(52) U.S. Cl. .................... 709/227; 709/228; 709/249; 370/331; 370/351; 370/352; 370/355; 455/436; 455/435.1
(58) Field of Classification Search ................ 370/331, 370/338, 351, 352, 328, 401, 355, 439, 395.2; 455/435, 436, 404.1, 405, 406; 726/2; 725/114
See application file for complete search history.

(56) References Cited

U.S. PATENT DOCUMENTS

2002/0026473 A1    2/2002  Gourraud (Continued)

FOREIGN PATENT DOCUMENTS

WO    WO 02/19749    3/2002
WO    WO 02/087265   10/2002

OTHER PUBLICATIONS

3GPP TS 23.218 V5.0.0 (Mar. 2002) Technical Specifications, 3rd Generation Partnership Project; Technical Specification Group Core Network; IP Multimedia (IM) Session Handlnig; IP Multimedia (IM) call model; Stage 2 (Release 5).

(Continued)

*Primary Examiner*—Ashok Patel
(74) *Attorney, Agent, or Firm*—Squire, Sanders & Dempsey, LLP

(57) ABSTRACT

A communication system comprising a multimedia network and an entity that is external to the multimedia network and arranged to subscribe to the multimedia network for notifications regarding events that associates with at least one other entity of the communication system. The multimedia network comprises an information storage entity for storing user information and call state control function entities. The arrangement being such that subscription messages from the external entity are routed to at least one call state control function entity based on information stored in said information storage entity. The at least one call state control function entity is provided with storage means for storing information received in said subscription messages, and the at least one call state control function entity sends a notification in response to an event defined by said information stored at the storage means.

21 Claims, 5 Drawing Sheets

U.S. PATENT DOCUMENTS

2002/0131395 A1* 9/2002 Wang .................... 370/349

OTHER PUBLICATIONS

Rosenberg, "A Session Initiation Protocol (SIP) Event Package for Registrations", Internet Draft, May 28, 2002, pp. 1-24, XP002228499.

3GPP: 3G TR 23.821 V1.0.1 (Architecture Principles for Release 2000), 3G TR 23.821 V1.0.1, Jul. 2000, pp. 1-62, XP002175634.

Rizzetto et al, "A Voice Over IP Service Architecture for Integrated Communications", IEEE Network, IEEE Inc., New York, US, vol. 13, No. 3, May 1999, pp. 34-40, XP000870629.

* cited by examiner

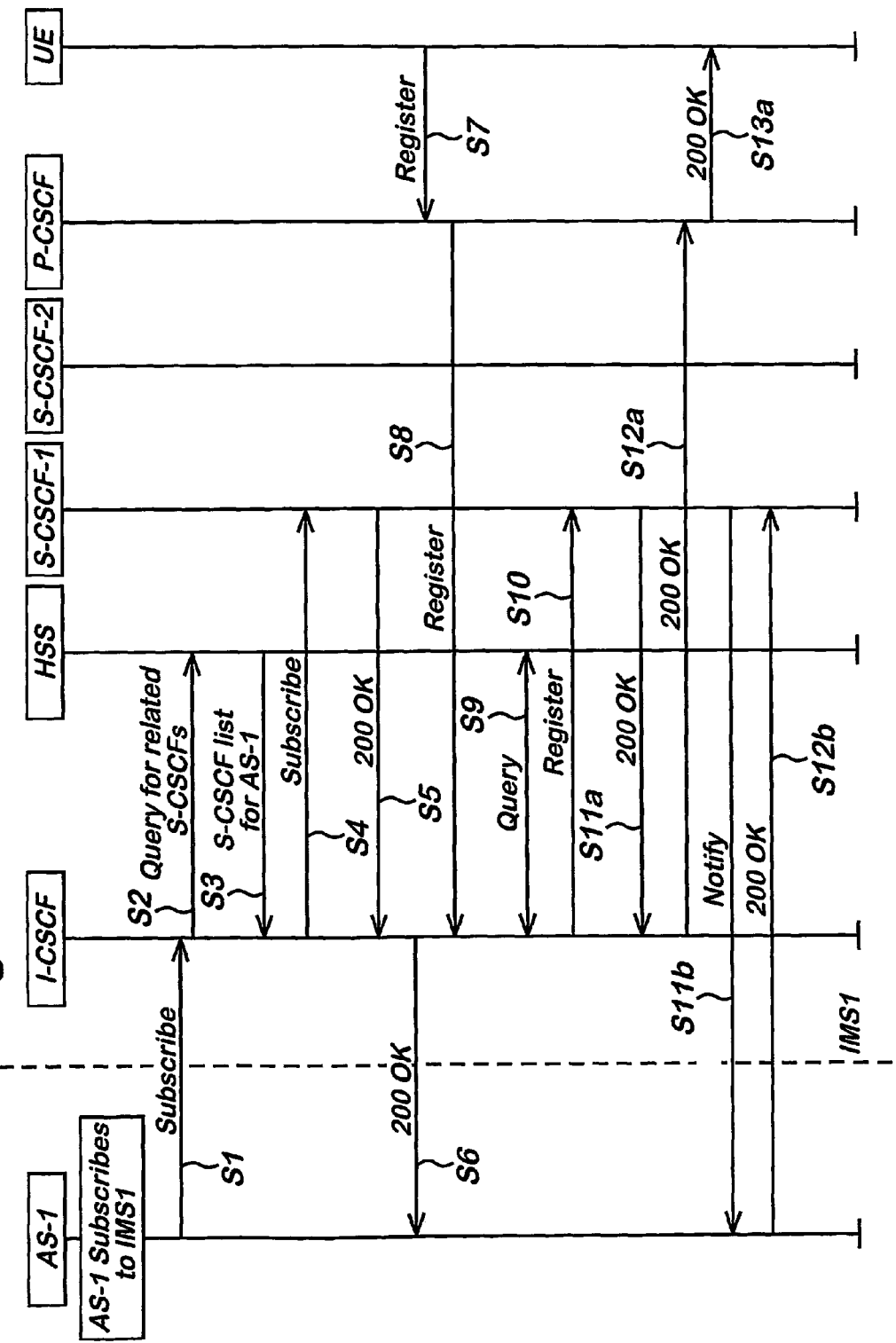

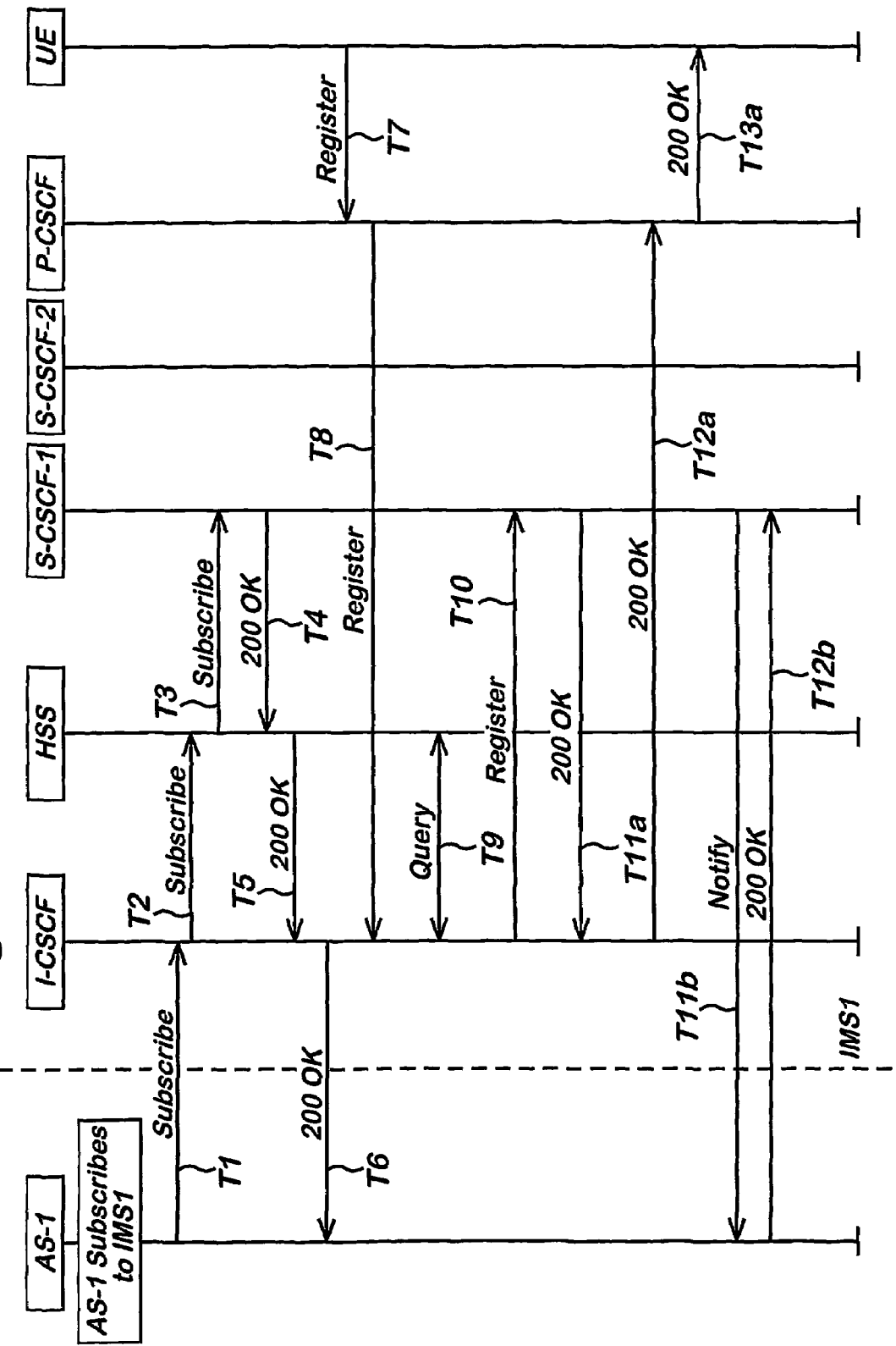
Fig. 5 HSS proxies subscribe to S-CSCF(s)

SYSTEM AND METHOD FOR EVENT NOTIFICATIONS IN A MULTIMEDIA NETWORK

FIELD OF INVENTION

The present invention relates to a communication system, in particular to reporting to a network node.

BACKGROUND TO THE INVENTION

A diverse range of communication systems are in use today enabling communication between two or more entities, such as user equipment and/or other nodes associated with the system. Such systems may comprise, for example, communication of voice, data, and multimedia data.

Communication systems proving wireless communication for user terminals or other nodes are known. An example of a wireless system is a public land mobile network (PLMN). A PLMN is typically a cellular network wherein a base transceiver station (BTS) or similar access entity serves user equipment (UE) such as mobile stations (MS) via a wireless interface. The operation of the apparatus required for the communication is usually controlled by one or more control entities, which themselves may be interconnected. One or more gateway nodes provide for connecting the PLMN to other networks. Examples of other such networks are another cellular network, a public switched telephone network (PSTN) and packet switched data networks such as an IP (Internet Protocol) based network. The communication between the user equipment and the other elements of the communication system are based on an appropriate communications protocol, which defines the "rules" under which communication is handled in the system.

In the current third generation (3G) wireless system, there are defined various servers for the handling of different communication services for mobile users. These include servers that provide call state control functions, known as CSCFs. Control functions may also be provided by entities such as a home subscriber server (HSS) and various application servers. The HSS is typically for permanently storing the user's (subscriber's) profile. For example, in the Release 5 architecture for 3G, as specified by the $3^{rd}$ Generation Partnership Project (3GPP), these entities can be found located in the IP Multimedia Subsystem (IMS).

The IMS network may sit at the hub of the 3G architecture, supporting an IP based network that handles both traditional voice telephony and multimedia services. The 3GPP has chosen Session Initiation Protocol (SIP) as a core session signalling protocol for 3G networks. SIP has been developed by the Internet Engineering Task Force (IETF). The 3GPP specification 24.229 describing the IMS network basic operation from an SIP perspective can be found at http://www.3gpp.org/ftp/Specs/Latest-drafts/24229-201.zip. It should be noted that SIP is a request/response style protocol, in the sense that for every message sent from a source, there is an associated response from the destination confirming receipt of the sent message.

For example, in a 3G network, when a user first switches on his mobile terminal, he must register his user ID or address with the network before allowing the terminal to fully connect. This is done by sending an SIP 'REGISTER' message, which includes details of the users address, from the terminal to the IMS. The IMS processes this information, via the serving call state control function (S-CSCF), storing the relevant registration information at the HSS. This registration information may include the status of the user such as the location, terminal capability and user availability. The registration is acknowledged by the IMS through a suitable response message that is also in accordance with SIP. Subsequent registrations also take place ('re-REGISTER') whenever the preceding registration has expired, or when there is a change in the status of the user or another reason to refresh the registration. When a user wishes to set up a session with another user, such as a voice call or sending of a text message, the session negotiation will also be performed under SIP. Typically such a negotiation will use the SIP INVITE message, which is sent from one user to another via the IMS.

Other services, such as instant messaging, local traffic reports, and conferencing facilities, are supplied by application servers (AS) via the IMS. An AS may reside within the IMS network, or outside of it. Typically the AS is external when the service supported is provided by a third party. For example, an AS providing local traffic reports may need the latest information on the status of any users subscribing to that service. As we have noted above, status information can be updated using an SIP re-REGISTER message. The AS server requiring this status information therefore subscribes, using an SIP SUBSCRIBE message, to all the REGISTER messages sent by each and every user subscribing to the instant messaging service offered by the AS. One SUBSCRIBE message is required per subscriber that the AS wishes to receive updates on. The IMS logs these SUBSCRIBE messages, and sends out a NOTIFY message to the AS every time a relevant REGISTER message is received. The AS can then use this information to implement its traffic reporting service.

The reception of a REGISTER message can be classified as an event. Events can be any change of state and associates with an entity, such as a user or another node, in the communication system. Thus an AS can subscribe specifically to REGISTERs, as in the above example, other SIP messages such as INVITEs, or other status changes not specifically associated with an individual SIP message.

Currently, when an external AS or other element subscribes to events in the IMS, it needs to provide the address of a specific IMS element, such as an S-CSCF, that it wishes to send the SUBSCRIBE message to. The internal structure of the IMS is therefore not entirely transparent, and requires the AS to have certain knowledge of where the SUBSCRIBE messages should be addressed. Specifically, the AS requires an exact address for locating the S-CSCF. The IMS operator would normally be reluctant to disclose specific addressing information to the operator of the AS, which would reveal much about the internal configurations of the IMS operator's proprietary system.

An AS may have many users subscribing to the service it provides. In such a situation, the AS would have to send as many SUBSCRIBE messages as it has subscribing users, and also need to know where to send each SUBSCRIBE message as each user may register its status with different elements (S-CSCFs) in the IMS.

It shall be appreciated that although the above discussed problems relate to subscriptions to SIP events in IP based third generation (3G) communication systems, similar disadvantages may associate with other systems as well and thus the description is not limited to these examples.

SUMMARY OF THE INVENTION

Embodiments of the present invention aim to overcome one or several of the above problems.

According to one aspect of the present invention, there is provided a communication system comprising a multimedia network comprising an information storage entity for storing user information and call state control function entities; an entity that is external to the multimedia network and arranged to subscribe to the multimedia network for notifications regarding events that associate with at least one other entity of the communication system, the arrangement being such that subscription messages from the external entity are routed to at least one call state control function entity based on information stored in said information storage entity, said at least one call state control function entity is provided with storage means for storing information received in said subscription messages, and said at least one call state control function entity sends a notification in response to an event defined by said information stored at the storage means.

In preferred embodiments of the present invention, the subscription messages are routed to the at least one call state control function entity via the information storage entity. The multimedia network may comprise an IP multimedia subsystem (IMS).

Preferably the information stored at the information storage entity contains information regarding those call state control function entities the external entity can subscribe to.

Preferably, the notification is sent to the external entity, and the external entity may comprise an application server. Specifically, the application server may be presence server. The information storage entity may comprise a home subscriber server. The call state control function entity may comprise a serving call state control function entity. The external entity may comprise a user equipment.

Preferably the at least one other entity comprises a user equipment.

The communication system may operate in accordance with a session initiation protocol (SIP), and the events are events of that protocol. The subscription message may comprise a SIP SUBSCRIBE message, and the notification comprises a SIP NOTIFY message.

According to a second aspect of the present invention, there is provided a method for sending notifications in a communication system comprising a multimedia network, an entity that is external to the multimedia network and at least one other entity, the multimedia network including an information storage entity and call state control function entities, the method comprising: subscribing by the external entity to the multimedia network for notifications regarding events associated with the at least one other entity; routing of subscription messages from the external entity to at least one call state control function entity based on information stored in said information storage entity; storing in storage means associated with said at least one call state control function entity information received in said subscription messages; and sending a notification by the call state control function in response to an event defined by said information stored at the storage means.

BRIEF DESCRIPTION OF DRAWINGS

Embodiments of the present invention will now be described by way of example with reference to the accompanying drawings, in which:

FIG. 4 illustrates the message flow from an Application Server to the IMS, and from a User Endpoint and the IMS during subscription of events in an embodiment of the present invention; and FIG. 5 illustrates the message flow of another embodiment of the present invention.

DETAILED DESCRIPTION OF EMBODIMENTS

Figure 1:
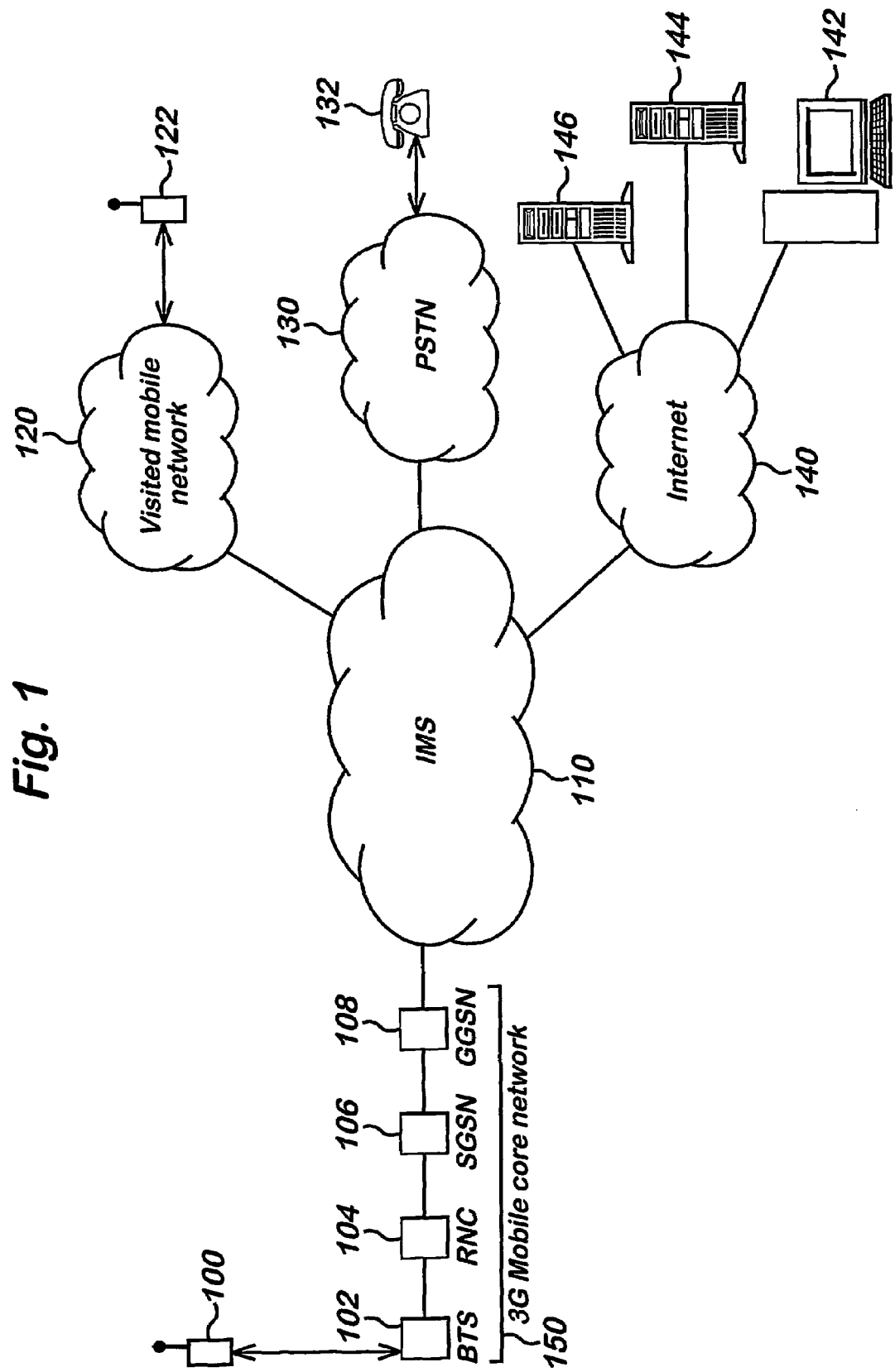
FIG. 1 illustrates a communication system wherein the present invention can be applied.

Reference will now first be made to the FIG. 1, which illustrates a typical $3^{rd}$ Generation (3G) Wireless telecommunications system operating under the Universal Mobile Telecommunications System (UMTS). At the hub of this system is the IP Multimedia Subsystem (IMS) 110 network, which routes calls between two or more users of the network. Examples of users are mobile terminal 100 of the home network, mobile terminal 122 in a visited mobile network 120, Public Switched Telephone Network (PSTN) telephone 132, computer terminal 142, and application server (AS-1) 144, such as a presence server, and application server (AS-2) 146. Examples not shown in FIG. 1 may include laptops, personal desktop assistants (PDAs), and other suitably configured devices. The IMS uses an IP based network to handle these calls, which may include both voice calls and multimedia calls.

The IMS network effectively acts as a gateway in a 3G system between a mobile terminal and other networks such as other mobile networks 120, PSTN systems 130, and external IP based networks 140. Signalling between the mobile terminal and other users of the IMS network, and within the IMS network, is done under the Session Initiation Protocol (SIP).

Typical nodes between the mobile terminal 100 and the IMS include a base transceiver station (BTS) 102, a radio network controller (RNC) 104, a serving GPRS (General Packet Radio Service) support node (SGSN) 106, and a gateway GPRS support node (GGSN) 108. These are typically referred to collectively as the 3G mobile core network 150. The GGSN acts as the gateway from the mobile core network to the IMS.

The 3G mobile core network 150, the IMS network 110, and the IP based network 140 are all considered part of the home network of the mobile terminal 100. The mobile terminal 122 is shown communicating with a visited mobile network 120. This network may also operate under a 3G system, in which case it too will have similar elements to those shown in the rest of FIG. 2, including its own IMS network. The link between the home network and the visited network will be at an interface between the home IMS network and the visited IMS network.

Figure 2:
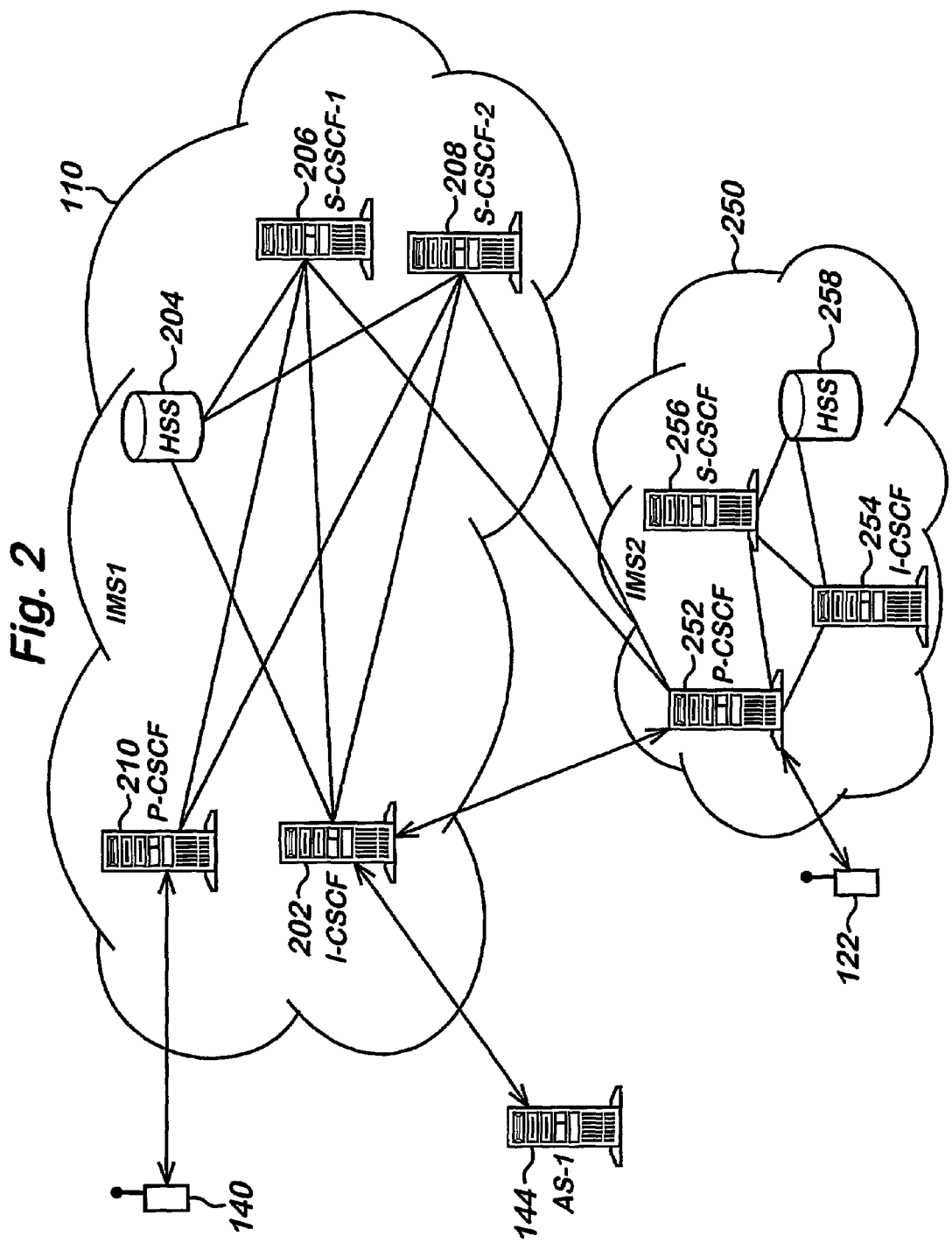
FIG. 2 illustrates one embodiment of the present invention.

Reference will now be made to FIG. 2, which shows a detailed schematic of the home IMS network (IMS1) 110 and the visited IMS network (IMS2) 250 in an embodiment of the present invention. IMS1 includes various elements including several Call State Control Functions (CSCF) 202, 206, 208 and 210, and a Home Subscriber Server (HSS) 204. A CSCF is equivalent to a SIP server in the IETF architecture.

The Interrogating CSCF (I-CSCF) 202 is the basic IMS node used for terminating calls in the IMS network, functioning at the edge of the network. Here, it is shown communicating with the external nodes of the mobile terminal 140 (indirectly via Proxy-CSCF 210), and the application server (AS-1) 144. It should be appreciated that the connections between the mobile terminal and the application server to the I-CSCF may not be direct, but via a suitable intermediate network such as the mobile core network 150 for the mobile terminal, and the Internet 140 for the application server, as shown in FIG. 1.

The Proxy CSCF (P-CSCF) 210 is the first point of call in a visited IMS network. Its primary task is to route messages from the visited IMS network to the home IMS network, or more specifically to the I-CSCF before registration has taken place or to the S-CSCF once registration has taken place. It also performs a similar role in the home network for a user such as mobile terminal 100.

The S-CSCFs, 206 and 208, are the IMS nodes responsible for invoking services related to IMS users. They also act as the registrars for IMS users, where registrations from users are processed. It is therefore the S-CSCFs that detect the specific events subscribed to any associated user, then sends out an appropriate NOTIFY message.

Normally the REGISTER message from a user is routed from the P-CSCF to the I-CSCF, which in turn routes it to the appropriate S-CSCF. However, during registration the network normally returns the address of the S-CSCF to the P-CSCF. Thus, once registration has taken place, subsequent non-REGISTER messages will be routed directly from P-CSCF to S-CSCF.

It should be appreciated by those skilled in the art the connections between the elements shown in FIG. 2 are not exhaustive, and others may exist depending on the nature of the messages sent. For example, in terminating calls, when calling party's home network (IMS1) connects to called party's home network (IMS2), the connection will normally be made from S-CSCF 206 of calling party towards I-CSCF 254 of called party's IMS network, and not via the P-CSCF. This and other similar connections have not been shown for the sake of simplicity.

A simplified example of the typical message flow for a SUBSCRIBE from User A to REGISTER messages from User B is as follows:
1. S-CSCF in user B's home domain receives a SUBCRIBE to REGISTER events of User B from User A;
2. S-CSCF updates its database with this new event package subscription relating to User A, and acknowledges receipt of the SUBSCRIBE message with a 200 OK message;
3. User B then sends a REGISTER message to S-CSCF;
4. S-CSCF in user B's home domain acknowledges receipt of the REGISTER message with a 200 OK message to User B; and then
5. S-CSCF in user B's home domain sends a NOTIFY message to User A to inform of the REGISTER message it has just received from User B;
6. User A responds with a 200 OK message.

Another example of the message flow for a SUBSCRIBE from an application server AS to REGISTER messages from User B is as follows:
1. S-CSCF in user B's home domain receives a SUBCRIBE to REGISTER events of User B from AS;
2. S-CSCF updates its database with this new event package subscription relating to AS, and acknowledges receipt of the SUBSCRIBE message with a 200 OK message;
3. User B then sends a REGISTER message to S-CSCF;
4. S-CSCF in user B's home domain acknowledges receipt of the REGISTER message with a 200 OK message; and then
5. S-CSCF in user B's home domain sends a NOTIFY message to inform AS of the REGISTER message it has just received from User B;
6. AS responds with a 200 OK message.

What is important in the embodiments of the present invention is that the S-CSCF maintains information on each user's service profile and thus knows which user has services in which AS. The S-CSCF also maintains a record of the ASs and the SIP event packages they have subscribed to. This means that for any AS used by an IMS user registered to a given S-CSCF, there is information on which SIP events each AS has subscribed to. As shown above, this SIP event information is updated whenever the S-CSCF receives a subscription for a SIP event from an AS. In effect, this means that an AS can subscribe to all relevant users in the IMS network with just one SUBSCRIBE message.

Note that the user information and the AS event subscription information is separated in the S-CSCF's database, which means that the general subscriptions to SIP events, relating to any IMS user, are stored only once per AS.

The HSS is a centralised user database that interfaces with both the I-CSCF and the S-CSCF, storing information on all users of the IMS. In one embodiment of the present invention, the HSS maintains a database of all external ASs which are allowed to subscribe to SIP events occurring in the IMS network, thereby performing a filter function on the ASs. The database contains relevant information on which S-CSCFs in the IMS relates to specific SIP event subscriptions for each AS. An example of the database in the HSS is shown in FIG. 3.

Figure 3:
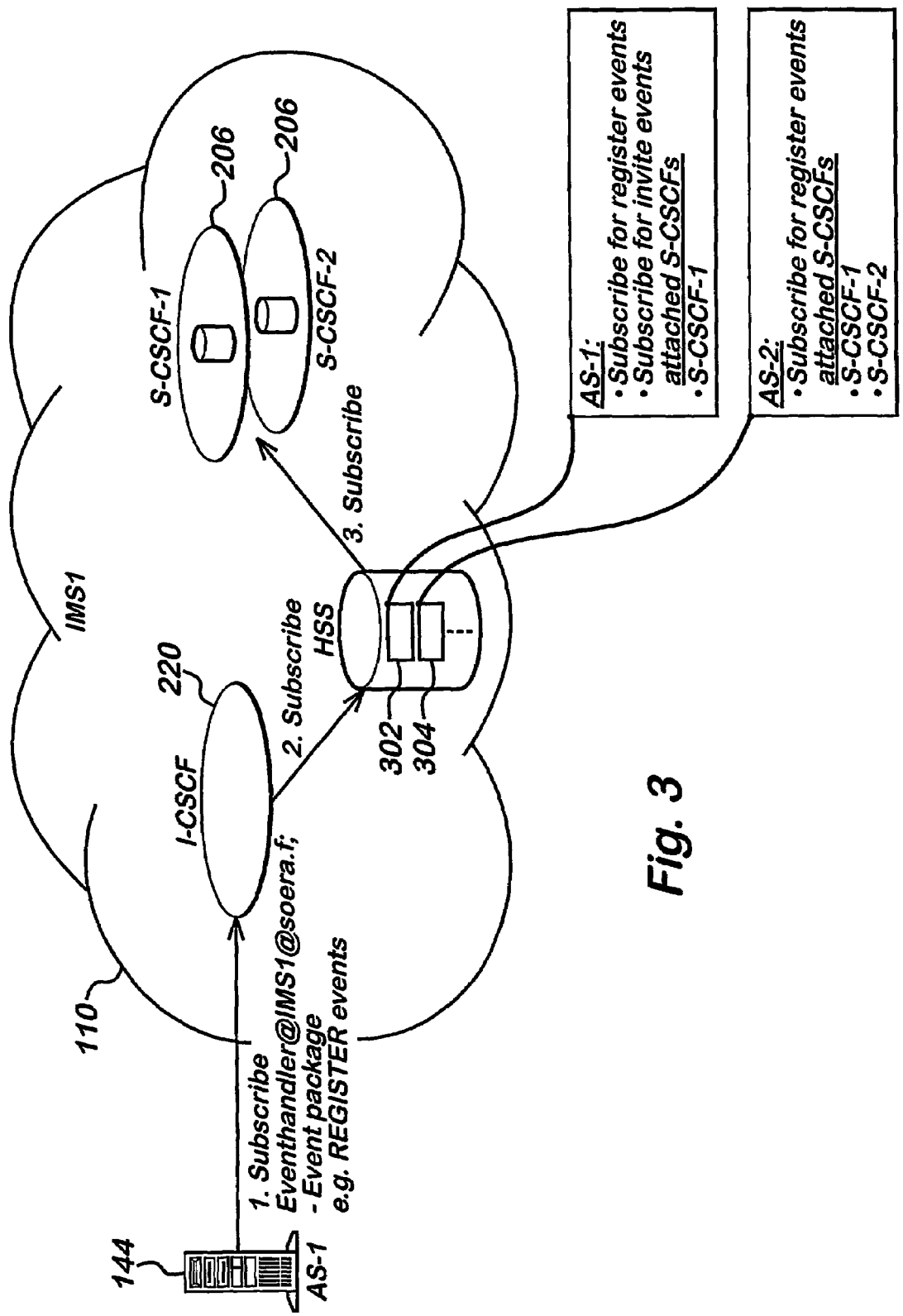
FIG. 3 illustrates an example of a multimedia network

In FIG. 3, the database for AS-1, 302, is shown to include the following entries:
AS-1
SUBSCRIBE to REGISTER events
SUBSCRIBE to INVITE events
attached S-CSCFs
S-CSCF-1

Likewise, the database for AS-2, 304, includes the following entries:
AS-2
SUBSCRIBE to REGISTER events
attached S-CSCFs
S-CSCF-1
S-CSCF-2

Only 2 entries, 302 and 304, have been shown in this embodiment, but there may be more entries depending on the number of application servers that are in use.

The arrangement above means that the list of S-CSCFs connected to the AS must be updated whenever the AS is configured to some user's profile i.e. whenever any user signs up for the services of the AS.

However it is important to note that user profile information and the AS information are stored separately in the HSS database.

The visited IMS network 250 shown includes similar elements to the home IMS network. There is P-CSCF 252, an I-CSCF 254, a S-CSCF 256, and a HSS 258. Also shown is a visiting mobile terminal 122 in communication with the P-CSCF in the visited IMS network. This P-CSCF will forward any messages from the mobile terminal 122 back to its home IMS network via I-CSCF 202 or directly to S-CSCF 206 as appropriate.

FIG. 4 shows the typical message flow when AS-1 subscribes to the REGISTER event in one embodiment of the present invention, where the I-CSCF sends the SUBSCRIBE message to S-CSCF directly. FIG. 5 shows another embodiment where the HSS is used as a proxy by the I-CSCF for sending the SUBSCRIBE message to the appropriate S-CSCF.

The function of the elements in FIG. 2, in relation to how subscriptions to SIP events are handled in the home IMS network, will now be described in more detail at first with reference to the message flow diagram FIG. 4, then FIG. 5.

FIG. 4 describes the following process:

1. AS-1 144 sends an SIP 'SUBSCRIBE to REGISTER events' message, S1, to the IMS, which is handled initially by the I-CSCF 202. This can be done as the IMS address used to direct the message to the IMS should point towards an I-CSCF node for terminating sessions.
2. The I-CSCF then queries, S2, the HSS for a list of S-CSCFs to which the SUBSCRIBE messages from AS-1 should be sent to.
3. HSS 204 returns a list, S3, of all relevant S-CSCFs to I-CSCF. In this case it is S-CSCF-1 206.
4. I-CSCF proxies the SUBSCRIBE message to S-CSCF-1, S4. S-CSCF-1 receives the SUBSCRIBE and updates this new SIP event package subscription to its database for AS-1. Information as to the source of the SUBSCRIBE message, in this case AS-1, can be found within the message.
5. S-CSCF-1 acknowledges, S5, the SUBSCRIBE to the I-CSCF with a '200 OK' message.
6. I-CSCF receives the acknowledgement from S-CSCF-1 and sends a similar acknowledgment, S6, to AS-1.
7. User Endpoint (UE), which in this example is the mobile terminal 122, sends a REGISTER message, S7, to P-CSCF 252.
8. P-CSCF routes, S8, this message to I-CSCF 202.
9. I-CSCF queries, S9, the HSS for information on which S-CSCF the REGISTER message should be sent to.
10. I-CSCF forwards the REGISTER message, S10, to S-CSCF-1.
11. S-CSCF-1 acknowledges the REGISTER with a '200 OK' message, S11a, to the I-CSCF which routes it back, S12a and S13a, to the UE.
12. S-CSCF-1 checks the service profile of UE to find all ASs associated with it. It then checks what subscriptions each of those ASs have made.
13. In this case, S-CSCF-1 finds that UE is associated with AS-1, and that AS-1 has subscribed to REGISTER events. It therefore sends a NOTIFY message, S11b, to AS-1 to inform it of this occurrence.
14. AS-1 acknowledges with a '200 OK' message, S12b. This acknowledgment may contain additional information on the success of the subscription.

FIG. 5 describes a similar process to FIG. 4, but here the I-CSCF uses the HSS to proxy the S-CSCF on its behalf, rather than doing so directly. The process is therefore identical except for steps S2 to S5 of FIG. 4, which are effectively replaced by steps T2 to T5 in FIG. 5. Steps T2 to T5 will now be discussed in further detail below:

1. When I-CSCF receives the SUBSCRIBE message, T1, from AS-1, it proxies the message, T2, to the HSS.
2. The HSS looks up in its list which S-CSCFs the SUBSCRIBE message should be sent to, in this case S-CSCF-1, and in turn proxies the SUBSCRIBE message, T3, to S-CSCF-1.
3. S-CSCF-1 receives the SUBSCRIBE message and updates this new event package to its database for AS-1, and sends an acknowledgment, T4, to HSS, which proxies it back, T5, to the I-CSCF.

The remaining processes from T6 to T12b are the same as the numerical equivalents S6 to S12b.

One advantage of embodiments of the present invention is that any external network node, such as application servers, user equipment, or any other user operating under SIP, may approach the IMS network as if it were a standalone SIP server. As a result, external nodes may use the IMS address of an IMS entity (e.g. IMS user or IMS 'registrar') and send any SIP event subscriptions to IMS without needing to know the internal architecture of the IMS network. This is an important advantage as otherwise the AS would have to know precisely which user is served by which S-CSCF before it sending its subscriptions. A further benefit of hiding the internal structure of the IMS is provided for operators who do not want their competitors gaining knowledge of their proprietary architecture.

Another advantage is that with a single SUBSCRIBE message, an AS can subscribe to events associated with a plurality or all the relevant users in the IMS network without requiring one message per user as previously. This may simplify subscription management in the AS significantly. Consequently, as the IMS elements only need to store one subscription per AS and not separate data relating to each and every user to the AS, considerable savings in storage requirements may be gained, in particular at entities such as the HSS and S-CSCF.

The embodiments also provide for greater flexibility in the addressing of the AS, allowing for multiple addresses per AS. This means that a single AS can present itself to the IMS with different addresses, which allows for a variety of event subscription schemes between different IMS users.

It should be appreciated that the IMS network 110 may also comprise further S-CSCFs and Proxy CSCFs (P-CSCF). Likewise, although embodiments of the present invention have been described in the context of 3G using SIP, other suitable systems and interface protocols could be used.

It is also noted herein that while the above describes exemplifying embodiments of the invention, there are several variations and modifications which may be made to the disclosed solution without departing from the scope of the present invention as defined in the appended claims.

The invention claimed is:

1. A communication system comprising:
    a multimedia network comprising an internet protocol multimedia subsystem, the multimedia network further comprising a home subscriber server configured to store user information and call state control function entities;
    an entity that is external to the multimedia network and configured to subscribe to the multimedia network for notifications regarding events that associate with at least one other entity of the communication system, the configuration being such that
    subscription messages from the external entity are routed to at least one serving call state control function entity based on information stored in said home subscriber server,
    said at least one serving call state control function entity is provided with a storage configured to store information received in said subscription messages, and
    said at least one serving call state control function entity sends a notification in response to an event defined by said information stored in the store of the serving call state control function entity.

2. A communication system as claimed in claim 1, wherein the subscription messages are routed to the at least one serving call state control function entity via the home subscriber server.

3. A communication system as claimed in claim 1 wherein the information stored at the home subscriber server contains information regarding those serving call state control function entities the external entity is able to subscribe to.

4. A communication system as claimed in claim 1, wherein the notification is sent to the external entity.

5. A communication system as claimed in claim 1, wherein the external entity comprises an application server.

6. A communication system as claimed in claim 5, wherein the application server is a presence server.

7. A communication system as claimed in claim 1, wherein the external entity comprises a user equipment.

8. A communication system as claimed in claim 1, wherein the at least one other entity comprises a user equipment.

9. A communication system as claimed in claim 1, wherein the system operates in accordance with a session initiation protocol, and the events are events of that protocol.

10. A communication system as claimed in claim 9 wherein the subscription message comprises a session initiation protocol subscribe message, and the notification comprises a session initiation protocol notify message.

11. A method comprising:
sending notifications in a communication system;
subscribing by an entity that is external to a multimedia network of the communications system for notifications regarding events associated with at least one other entity, the multimedia network comprising an internet protocol multimedia subsystem;
routing of subscription messages from the external entity to at least one of a plurality of serving call state control function entities of the multimedia network based on information stored in home subscriber server of the multimedia network;
storing in a store associated with said at least one serving call state control function entity information received in said subscription messages; and
sending a notification by the serving call state control function in response to an event defined by said information stored in said store associated with said at least one serving call state control function entity.

12. A method as claimed in claim 11, wherein the subscription messages are routed to the at least one serving call state control function entity via the home subscriber server.

13. A method as claimed in claim 11, wherein the information stored at the home subscriber server contains information regarding those serving call state control function entities the external entity is able to subscribe to.

14. A method as claimed in claim 11, wherein the notification is sent to the external entity.

15. A method as claimed in claim 11, wherein the external entity comprises an application server.

16. A method as claimed in claim 15, wherein the application server is a presence server.

17. A method as claimed in claim 11, wherein the external entity comprises a user equipment.

18. A method as claimed in claim 11, wherein the at least one other entity comprises a user equipment.

19. A method as claimed in claim 11, wherein the method operates in accordance with a session initiation protocol, and the events are events of that protocol.

20. A method as claimed in claim 19 wherein the subscription message comprises a session initiation protocol subscribe message, and the notification comprises a session initiation protocol notify message.

21. A communication system comprising:
a multimedia network comprising an internet protocol multimedia subsystem, the multimedia network further comprising a home subscriber server configured to store user information and call state control function entities;
an entity that is external to the multimedia network and comprising a means for subscribing to the multimedia network for notifications regarding events that associate with at least one other entity of the communication system;
means for routing subscription messages from the external entity to at least one serving call state control function entity based on information stored in said home subscriber server;
storage means in said at least one serving call state control function entity for storing information received in said subscription messages, and
sending means in said at least one serving call state control function entity configured to send a notification in response to an event defined by said information stored in said storage means in said at least one serving call state control function.

* * * * *